United States Patent
McNamer et al.

(10) Patent No.: US 6,606,671 B1
(45) Date of Patent: Aug. 12, 2003

(54) METHOD FOR ANALYZING INPUT/OUTPUT OPERATIONS OF A DATA PROCESSING SYSTEM

(75) Inventors: Timothy R. McNamer, Brooklyn Center, MN (US); Timothy L. Nelson, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/294,978

(22) Filed: Apr. 19, 1999

(51) Int. Cl.[7] .......................... G06F 11/34; G06F 11/30; G06F 17/40; G06F 17/30
(52) U.S. Cl. .......................... 710/18; 710/15; 702/179; 702/182; 702/187; 714/37; 714/45; 714/47; 717/127; 717/128
(58) Field of Search .......................... 717/4, 7, 8, 127, 717/128; 716/4, 6; 702/117, 118, 119, 120, 122, 179, 180, 182, 183, 186, 187, 188, 189; 714/37, 38, 39, 45, 46, 47, 732; 710/1, 5, 15, 16, 18, 19, 20, 33, 52

(56) References Cited

U.S. PATENT DOCUMENTS

| | | | | |
|---|---|---|---|---|
| 4,479,197 A | * | 10/1984 | Haag et al. | ................. 364/900 |
| 4,849,879 A | * | 7/1989 | Chinnaswamy et al. | ...... 706/45 |
| 5,088,058 A | * | 2/1992 | Salsburg | ...................... 364/500 |
| 5,483,468 A | * | 1/1996 | Chen et al. | .................. 702/186 |
| 6,094,729 A | * | 7/2000 | Mann | ........................... 714/25 |
| 6,112,238 A | * | 8/2000 | Boyd et al. | .................. 709/224 |
| 6,202,199 B1 | * | 3/2001 | Wygodny et al. | ............... 717/4 |
| 6,311,326 B1 | * | 10/2001 | Shagam | ......................... 717/4 |
| 6,332,178 B1 | * | 12/2001 | Dean et al. | .................. 702/179 |
| 6,513,155 B1 | * | 1/2003 | Alexander et al. | .......... 717/124 |
| 6,535,949 B1 | * | 3/2003 | Parker | ........................ 711/103 |

OTHER PUBLICATIONS dBase IV Language Reference, Ashton–Tate Corporation 1988, pp 1–2 to 1–3; 1–9 to 1–11; 2–91 to 2–92; 2–161 to 2–162.*

* cited by examiner

*Primary Examiner*—Jeffrey Gaffin
*Assistant Examiner*—Tanh Q. Nguyen
(74) *Attorney, Agent, or Firm*—Charles A. Johnson; Mark T. Starr; Crawford, Maunu, PLLC

(57) ABSTRACT

A method for analyzing input/output operations of a data processing system. Input/output trace data of the system is stored in an input/output trace file. The trace file is interactively analyzed by first interactively obtaining data selection criterion and then reading input/output trace data from the trace file in accordance with the selection criterion. The input/output trace data read from the trace file is displayed, and the steps of obtaining the data selection criteria and displaying the trace data are repeated.

15 Claims, 4 Drawing Sheets

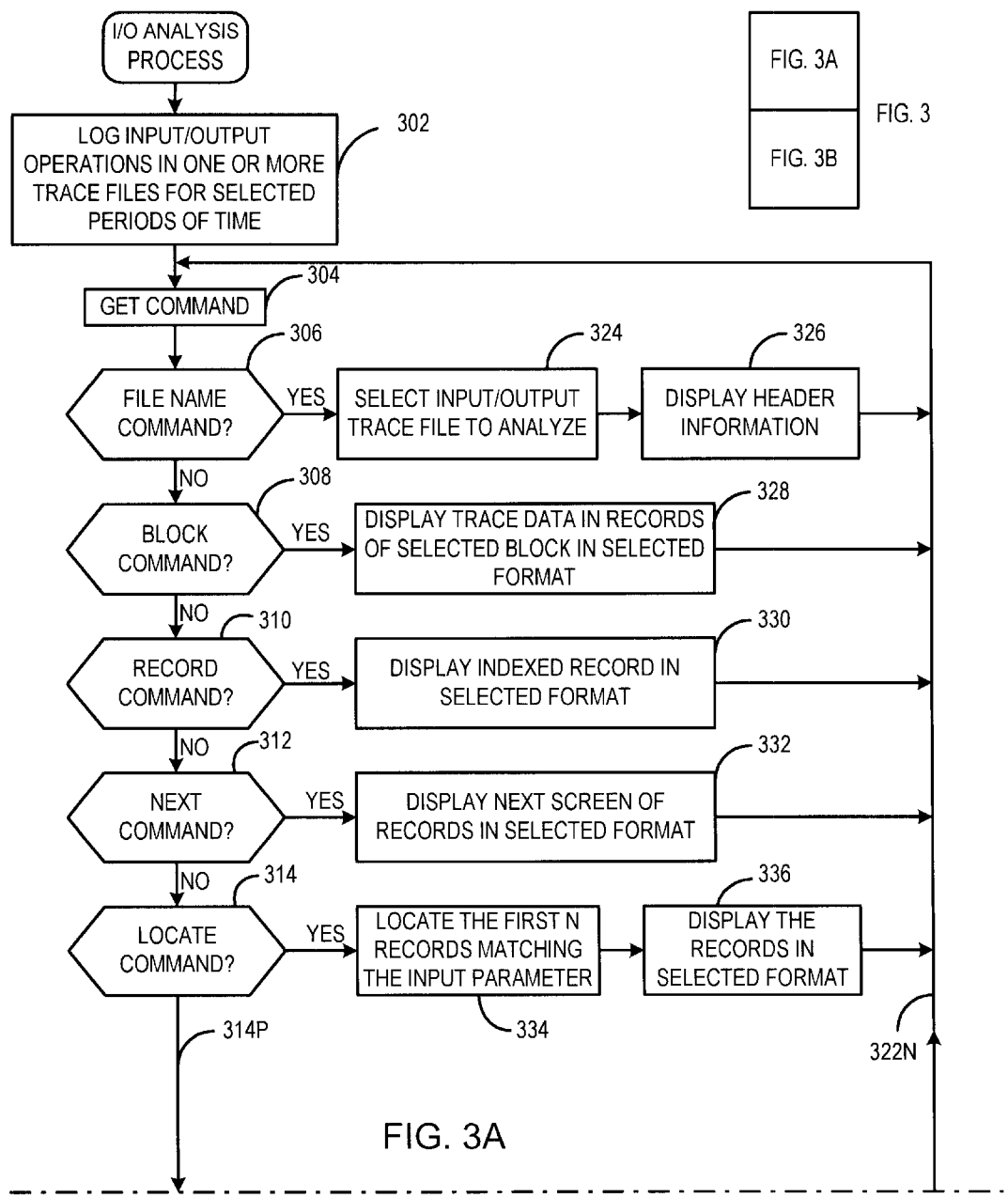

METHOD FOR ANALYZING INPUT/OUTPUT OPERATIONS OF A DATA PROCESSING SYSTEM

FIELD OF THE INVENTION

The present invention generally relates to performance analysis of data processing systems, and more particularly to analyzing the input/output operations performed by a data processing system.

BACKGROUND OF THE INVENTION

Various performance characteristics of data processing systems are modeled to demonstrate the capabilities of different system configurations. For example, the number of instructions/second executed by the system may be particularly relevant for some applications, while the number of input/output operations/second may be of interest for other applications. Hardware and software vendors often use proprietary tools to model a system's performance and estimate a performance increase when new hardware and/or software is added to the system.

In one example, Unisys Corporation uses a modeling tool to determine whether an outboard file cache, such as the Extended Processing Complex (XPC) product from Unisys, would enhance system performance. To use the model, the customer supplies a record of all input/output operations that occurred during a period of time for a present system. The record of input/output operations is referred to as the I/O trace file. The I/O trace file is then processed using he model to determine the performance level of the system with the addition of an outboard file cache.

It may be desirable to analyze the I/O trace file prior to modeling the system. This can be useful in identifying patterns associated with request types or locating blocks of I/O requests that are of particular interest to a user. For example, a user may be interested in a certain block or group of blocks of I/O requests and may desire performance analysis to be performed only on those blocks.

Viewing I/O trace files has often been difficult because the files are very large. Many conventional editors cannot read the entire trace file into memory. Thus, a common method to view the trace file has been to translate the trace file into a printable file, which can then be viewed either electronically or printed to obtain a hardcopy.

Electronically viewing a printable file is difficult for several reasons. First, I/O trace files are approximately 132 columns wide, and therefore, viewing can be awkward. Additionally, the data is binary, which without translation may be difficult to comprehend. Therefore, it can be time-consuming and difficult to locate particular I/O operations or blocks in the trace file.

A method that addresses the aforementioned problems, as well as other related problems, is therefore desirable.

SUMMARY OF THE INVENTION

A method for analyzing input/output operations of a data processing system is provided in various embodiments of the invention. In one embodiment, the method comprises storing input/output trace data of the system in an input/output trace file. The trace file is interactively analyzed by first interactively obtaining data selection criterion and then reading input/output trace data from the trace file in accordance with the selection criterion. The input/output trace data read from the trace file is displayed, and the steps of obtaining the data selection criteria and displaying the trace data are repeated.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
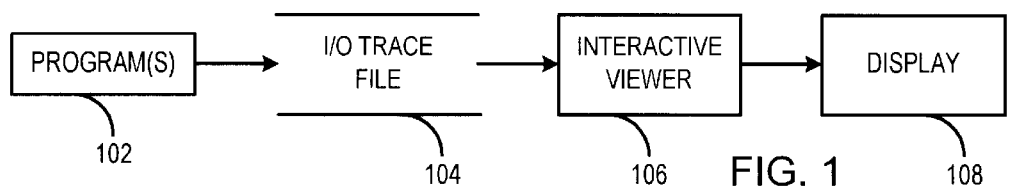
FIG. 1 is a data flow diagram illustrating the creation and interactive viewing of an I/O trace file.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE DRAWINGS

The present invention is believed to be applicable to a variety of systems for analyzing the I/O characteristics of applications hosted by a data processing system. The present invention has been found to be particularly applicable and beneficial in analyzing an I/O trace file having sequentially stored records of I/O operations. While the present invention is not so limited, an appreciation of the present invention is presented by way of particular example I/O trace records.

In an example embodiment, a trace file of audits for I/O operations occurring during a selected period of time is created while various programs are executing on a data processing system. The records of the trace file can be interactively selected and viewed with a software tool that provides search and display format functions.

FIG. 1 is a data flow diagram illustrating the creation and interactive viewing of an I/O trace file. The input/output operations of one or more programs 102 are logged to I/O trace file 104. Conventional operating systems, such as OS 2200 from Unisys Corporation, provide such logging capabilities.

After a selected period of time, which depends on user requirements, logging of I/O operations is stopped, and trace file 104 can be viewed using interactive viewer 106. In an alternative embodiment, a plurality of trace files could be created in order to gather I/O data for different scenarios. For example, different trace files can be created for a single program, wherein the different trace files cover different time periods in a day. The plurality of trace files could also be created when different suites of programs are active on the system.

Interactive viewer 106 reads the trace data from file 104 and outputs the data on display 108. Interactive viewer 106 is implemented as software in an example embodiment. The particular trace data and trace file read by interactive viewer 106 and the particular format in which data is presented on display 108 is interactively controlled via a command line user interface, for example. It will be appreciated that menu-based and/or point-and-click interfaces could be alternatively used. The data selection criteria includes, for example, indices of records of logged data and program identifiers.

The data can be viewed in four example formats. In one format, each word of a data record is displayed in binary format. In another format, character representations of the fields in the data records are displayed. Selected fields can also be displayed in 80- or 132-character columns in the other embodiments.

In an example embodiment, both program 102 and interactive viewer 106 are hosted by a 2200 Series data processing system from Unisys. However, it will be appreciated that other processing platforms could be used to implement the present invention.

Figure 2:
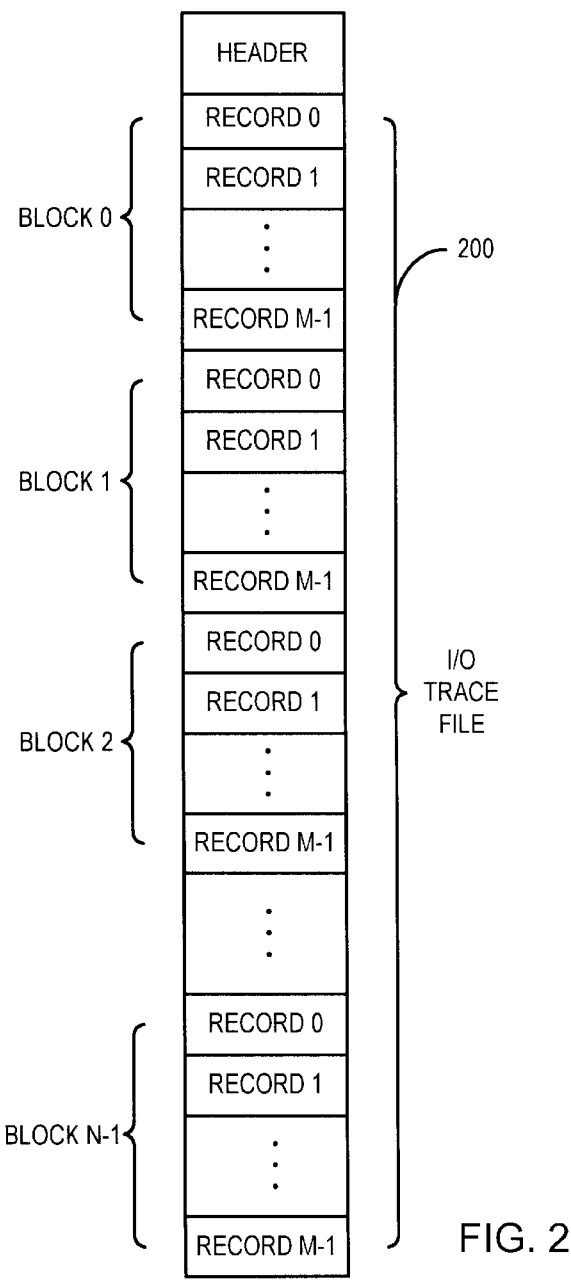
FIG. 2 is a block diagram of an example file containing records of input/output operations.

FIG. 2 is a block diagram of an example file 200 containing records of input/output operations. File 200 contains records that are conventionally logged by I/O routines of an operating system, for example, the OS 2200 operating system from Unisys.

File 200 is comprised of n blocks, designated as blocks 0–block n−1, and each block includes m records. File 200 is organized by block for the purpose of making efficient use of input/output resources. Specifically, m records are accumulated in the system's memory before logging them to trace file 200. This supports writing large data elements with a few operations rather than writing many small data elements with many operations.

Some example mnemonics of the fields of an input/output trace record are listed below, along with brief explanations.

ReqID is the identifier of the application program initiating the I/O operation.

FileName is the logical name of the file on which the operation was performed.

ER is the executive request, or type of operating system request that initiated the operation.

FN is the function code associated with the operation, for example read or write.

XfrSz is the number of words transferred in the operation.

Device is the numeric identifier associated with the device on which the operation was performed.

FRA is the file relative address at which the operation was performed.

DRA is the device relative address at which the operation was performed.

ERTime is the system time at which the operation was initiated.

Stop-time is the system time at which the operation was completed.

SWQ is the software queue time.

HWQ is the hardware queue time.

Access is the time to access the device.

RET is the request existence time.

HWS is the hardware service time.

Flags are bits indicating whether the I/O operation is a cache disk operation and/or which control units are being utilized.

Pr are the priority bits indicating Exec (OS 2200 operating system), TIP (transaction process), demand, or batch types of processes.

CB are the bits indicating the type of cache action (hit, miss, etc.).

CU is the control unit number.

Those skilled in the art will appreciate that input/output trace records could assume a variety of different forms and include different and/or additional content, depending on system requirements and capabilities.

Figure 3B:
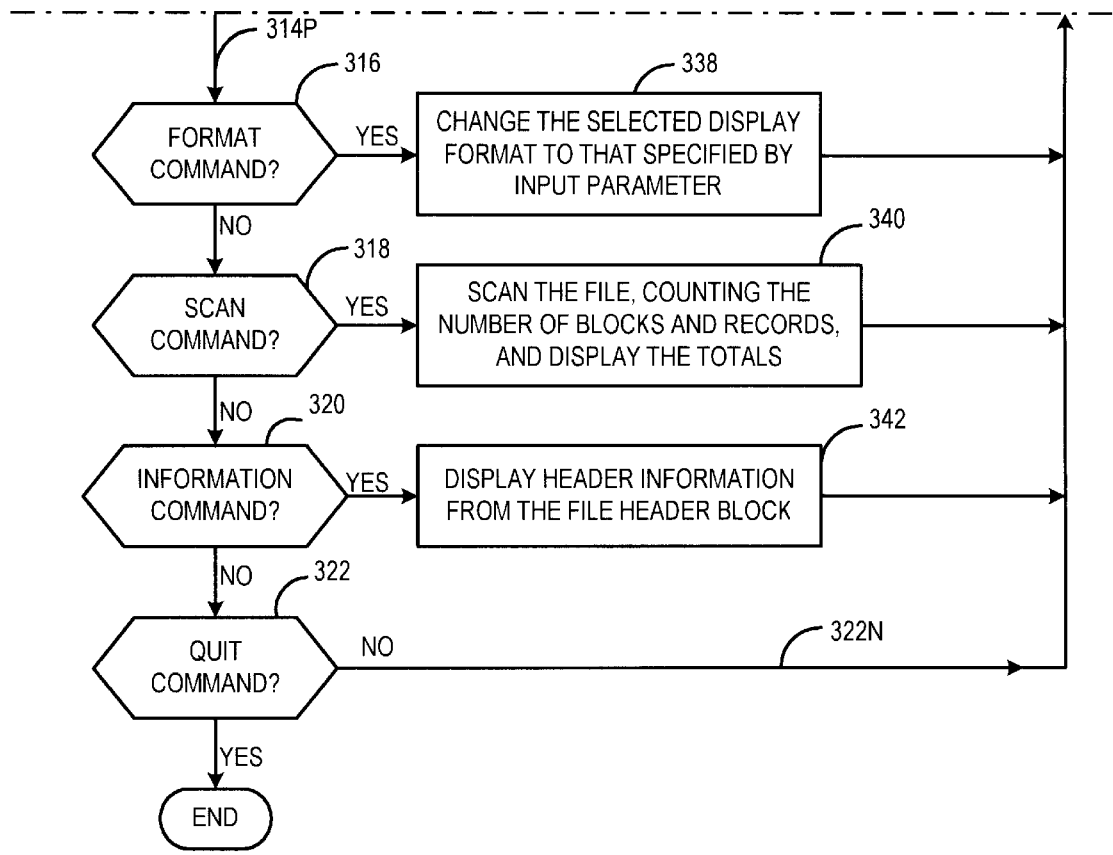
FIG. 3 includes FIGS. 3A and 3B, which together form a flowchart of an example method for interactive analysis of an I/O trace file.

FIG. 3 includes FIGS. 3A and 3B, which together form a flowchart of an example method for interactive analysis of an I/O trace file. The method generally comprises storing records of I/O operations in an I/O trace file for a selected period of time, and interactively viewing selected data of the I/O trace file in selected formats with a command driven interface.

At step 302, the I/O operations of a data processing system are logged to an I/O trace file. It will be appreciated that one or more trace files can be created depending on user requirements and the capabilities of the system that supports creating an I/O trace file. Once a trace file has been created, interactive viewer 106 can be used to view the file.

At step 304, viewer 106 solicits a command from the user, and decision steps 306–322 interpret the command. The "file name" command is used to select a trace file to view. The syntax of the example file name command is:

fn [filename]

When the file name command is issued without any parameters, the current file name is displayed. A different file can be viewed by supplying the name of another file as the parameter. Step 324 selects the trace file to analyze based upon the input filename parameter, and step 326 outputs information from the selected trace file to display 108. The header information may include, for example, the file name, system configuration parameters (input/output processors, channels, etc.), data block length, and other system dependent information.

Figure 4:
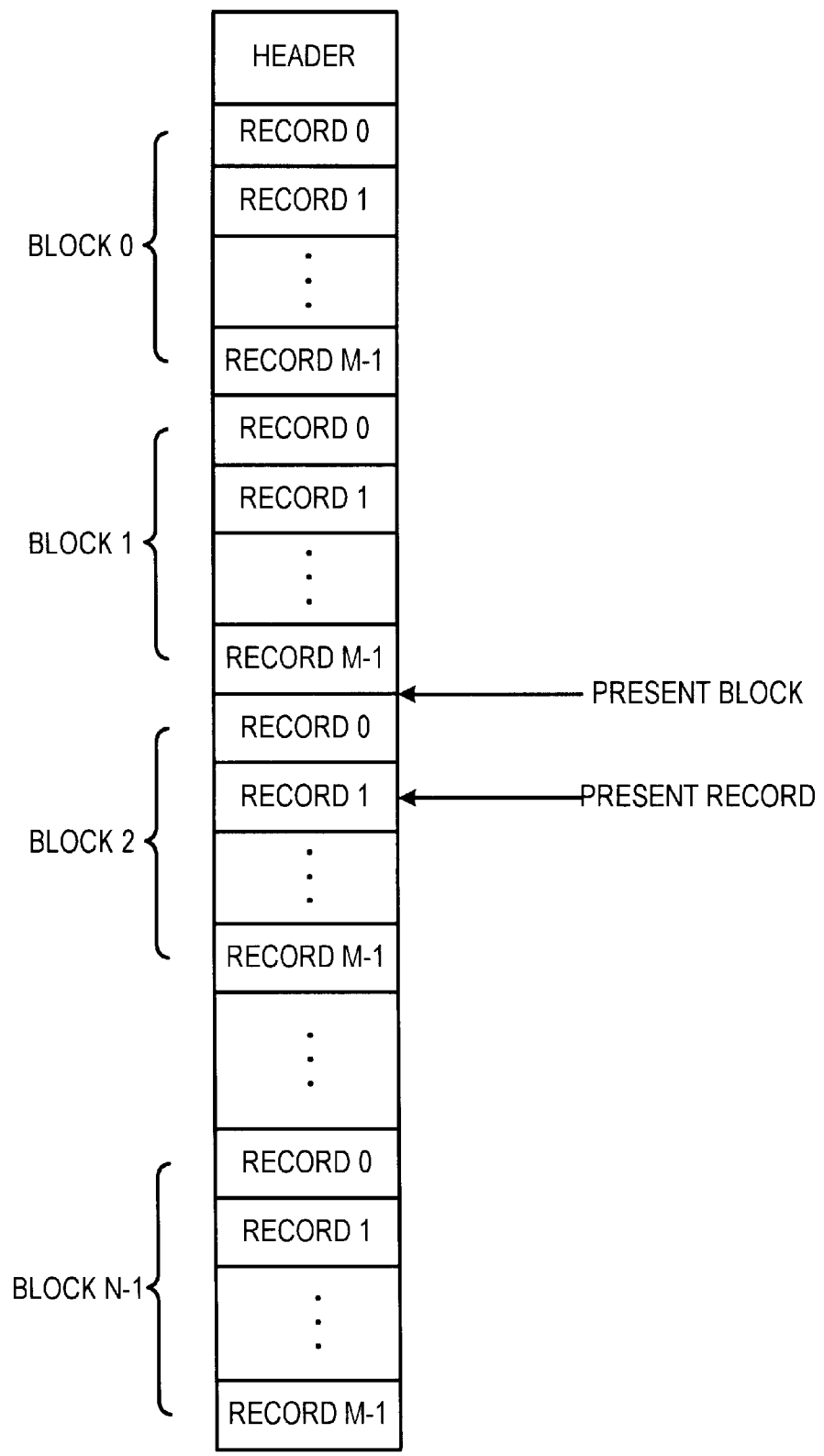
FIG. 4 shows trace file along with a present block pointer and a present record pointer.

If the command is a "block" command, decision step 308 directs control to step 328. The block command is used to display records of a selected block. Turning briefly to FIG. 4, trace file 200 is shown along with a present block pointer and a present record pointer. The pointers are used internally by interactive viewer 106 to track the currently displayed block and record. The pointers are adjusted accordingly when commands such as "block" and "record" are used to display different records.

The format in which the records are displayed can be adjusted with the "format" command, which is described below. The syntax of the block command is:

block [n|+n|−n]

When only "n" is specified, the present block pointer is moved to block n, and block n is displayed. When +n is specified, the present block pointer is advanced n blocks from the present position, and the new block is displayed. When −n is specified, the present block pointer is moved back n blocks from the present position, and the new block is displayed.

Returning now to FIG. 3A, if the "record" command is input, decision step 310 directs control to step 330. The record command changes the position of the present record pointer in the present block as specified by the index parameter, and the display is updated to show the data of the referenced record. The syntax of the record command is:

Rec index

At decision step 312, control is directed to step 332 if the "next" command is input. In response to the next command, interactive viewer 106 updates the display with data from the set of records that follows the records presently displayed. The present block pointer and the present record pointer are adjusted accordingly. The syntax of the next command is:

Next

The "locate" command can be used with individual ones of the fields of the trace records in order to locate one or more records that match the search criterion. Decision step 314 directs control to step 334 in response to a locate command. At step 334, interactive viewer 106 begins searching at the record that follows the present record pointer for records that match the search criterion. The search continues until the number of matches specified in the command are found or all the records in the file have been searched. At step 336 the located records are displayed in the presently selected format.

In the example locate commands that follow, the r parameter is optional and can be one of =, !=, <, <=, >, and >=, and the default is =. The n parameter is optional and can be used to specify the number of matches to find. The syntax of the locate command can be one of the following (explanations follow the "--" after each command):

Loc RID [r] name [n]--match requester ID
Loc PGM [r] name [n]--match PGM field
Loc FN [r] name [n]--match filename
Loc TIP [r] tipnum [n]--match the TIP file number Loc DVC [r] name|index [n]--match device
Loc DTP[r] name|index [n]--match device type
Loc ER [r] index [n]--match ER index
Loc FNC [r] index [n]--match function code
Loc FRA [r] number [n]--match file relative address
Loc DRA [r] number [n]--match device relative address
Loc XFR [r] number [n]--match transfer size
Loc [n]-- repeat previous search The "format" command is used to select a format in which data is displayed. Decision step 316 directs control to step 338 when the format command is input, and the display format is changed as specified by the command. The display formats include a binary format ("raw"), an ASCII format ("cooked"), and 80 and 132-character columns formats. The syntax of the format command is:

format [raw|cooked|80|132]

The parameters available for the format command include: raw, cooked, 80, and 132. The raw format causes the display of word numbers within a record and the binary values of the words. An example record displayed in the raw format is shown below:

Block 3 Record 14
(198) 102421 211210
(199) 505050 007766
(200) 000000 000000
(201) 204301 000012
(202) 003247 347500
(203) 000700 200000
(204) 000000 000014
(205) 000002 000005
(206) 001747 276660
(207) 040200 000000
(208) 000000 702260
(209) 162732 050505
(210) 050505 050505
(211) 000001 000003

The cooked format causes the display of records in ASCII format. An example record displayed in cooked format is shown below:

Block 3 Record 14
Name: COLLEC
Pgm: "IRU "ER: 02043 Func: 020
IQT: 52395913.6 LogDev: 10 CU: 1
SIOFDT: 0.0 FRA: 0000000702260 Chan: 0
SIOSIOF2: 0.4 DRA: 0003247347500 IOP: 12
SIOCEDE: 1.0 Wds: 0000700=448
SIOQTIME: 0.0 Flgs:------ Pr: 002 CBs: 000
SIOACC: 0.2 SIOTT: 0.6

In cooked format, the data displayed includes the control unit (CU) identifier, the channel (Chan) identifier, and the input/output processor (IOP) identifier, for example. The other data displayed is shown for example purposes only.

The parameter, 80, causes the display of records in an 80 column format, where selected fields of the record are displayed. The parameter, 132, provides for 132 columns of data, which permits the display of additional fields. The display of a record in 80 column format is illustrated below:

| ReqID | FileName | ER | FN | XfrSz | Device | FRA | DRA | ER Time |
|---|---|---|---|---|---|---|---|---|
| *3HR9N | *TI#0001144 | 0231 | 10 | 224 | DH19 | 000002342040 | 004063763600 | 14:33:15.909 |

At decision step 318, interactive viewer 106 directs control to step 340, where the trace file is scanned. The scan command scans the entire I/O trace file and displays the total number of blocks and records, as well as the start-time of the first operation and the end-time of the last operation. The syntax of the scan command is:

scan

Inputting an "information" command causes interactive viewer to direct control to step 342, where header information for the trace file is displayed. The syntax for the information command is:

info

Accordingly, the present invention provides, among other aspects, a method for analyzing I/O operations of a data processing system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A computer-implemented method for analyzing input/output operations of a data processing system hosting one or more programs, comprising:

storing input/output trace data of the system in records of an input/output trace file in time sequence order, the trace data characterizing input/output operations performed on the system, and the trace data for each operation being stored in a separate record having a plurality of data fields the trace file having a first record and a last record;

organizing the trace file in a plurality of blocks, each block including a plurality of records and the blocks ordered by times of records of the input/output trace data;

interactively obtaining data selection criterion, wherein the data selection criterion includes one of the group of a block number selection and a record index selection;

reading input/output trace data from the trace file in accordance with the selection criterion;

displaying the input/output trace data read from the trace file; and repeating the steps of obtaining the data selection criteria and displaying the trace data.

2. The method of claim 1, wherein the block number selection is relative to the first record in the trace file.

3. The method of claim 1, further comprising:

maintaining a present block number indicating which block of data is presently displayed; and wherein the block number selection is relative to the present block number.

4. The method of claim 3, wherein the block number selection is positive to select moving forward and is negative to select moving backward in the trace file.

5. The method of claim 1, further comprising:

maintaining a present record index indicating which record within a block of data is presently displayed; and wherein the record index selection is relative to the present record index.

6. The method of claim 5, wherein the record index selection is positive to select moving forward and is negative to select moving backward in the trace file.

7. The method of claim 1, further comprising:

organizing the trace file in a plurality of records, each record having a plurality of data field, wherein one of the data fields is a program identifier field, and the data selection criterion includes a program identifier, and locating a first occurrence of a record having a program identifier field with a value that matches the program identifier.

8. The method of claim 1, further comprising:

organizing the trace file in a plurality of records, each record having a plurality of data fields, wherein one of the data fields is a file name field, and the data selection criterion includes a file name; and locating a first occurrence of a record having a file name field with a value that matches the file name.

9. The method of claim 1, further comprising:

organizing the trace file in a plurality of records, each record having a plurality of data fields, wherein one of the data fields is a device type field, and the data selection criterion includes a device type; and locating a first occurrence of a record having a device type field with a value that matches the device type.

10. The method of claim 1, further comprising:

organizing the trace file in a plurality of records, each record having a plurality or data fields, wherein one of the data fields is a transfer size field, and the data selection criterion includes a transfer size; and locating a first occurrence of a record having a transfer size field with a value that matches the transfer size.

11. The method of claim 1, further comprising: interactively obtaining a display format selection for data in the trace file; and displaying the input/output trace data in the display format.

12. The method of claim 11, wherein the display format is one of the group of raw format, field format, 80-character column, and 132-character column, the raw format having word numbers and associated binary values, the field format having field names and associated character values, the 80-character column format having selected ones of the fields displayed in 80-character columns, and the 132-character column format having selected ones of the fields displayed in 132-character columns.

13. The method of claim 11, wherein interactively obtaining the display format selection comprises interpreting command line input.

14. The method of claim 1, wherein interactively obtaining the selection criterion comprises interpreting command line input.

15. An apparatus for analyzing input/output operations of a data processing system hosting one or more programs, comprising:

means for storing input/output trace data of the system in records of an input/output trace file in time sequence order, the trace data characterizing input/output operations performed on the system, and the trace data for each operation being stored in a separate record having a plurality of data fields, the trace file having a first record and a last record;

means for organizing the trace tile in a plurality of blocks, each block including a plurality of records and the blocks ordered by times of records of the input/output trace data;

means for interactively obtaining data selection criterion, wherein the data selection criterion includes one of the group of a block number selection and a record index selection;

means for reading input/output trace data from the trace file in accordance with the selection criterion;

means for displaying the input/output trace data read from the trace file; and means for repeating the steps of obtaining the data selection criteria and displaying the trace data.

* * * * *

UNITED STATES PATENT AND TRADEMARK OFFICE
CERTIFICATE OF CORRECTION

PATENT NO. : 6,606,671 B1
DATED : August 12, 2003
INVENTOR(S) : McNamer et al.

It is certified that error appears in the above-identified patent and that said Letters Patent is hereby corrected as shown below:

Column 7,
Line 54, "or data fields" should read -- of data fields --.

Column 8,
Line 38, "trace tile" should read -- trace file --.

Signed and Sealed this

Thirtieth Day of September, 2003

JAMES E. ROGAN
*Director of the United States Patent and Trademark Office*